United States Patent

[11] 3,572,813

| [72] | Inventor | Norio Takada |
| | | Hamamatsu-shi, Japan |
| [21] | Appl. No. | 810,093 |
| [22] | Filed | Mar. 25, 1969 |
| [45] | Patented | Mar. 30, 1971 |
| [73] | Assignee | Yamaha Hatsudoki Kabushiki Kaisha |
| | | Hamakita-shi, Shizuoka-ken, Japan |
| [32] | Priority | Mar. 30, 1968 |
| [33] | | Japan |
| [31] | | 43/25101 |

[54] DEVICE FOR ENGAGING A FRONT COVER WITH A SNOW VEHICLE BODY
7 Claims, 5 Drawing Figs.

[52] U.S. Cl. .................................................. 296/28, 180/5, 180/69
[51] Int. Cl. .................................................. B62d 25/10
[50] Field of Search ......................................... 296/28; 180/69, 69 (C), 5

[56] References Cited
UNITED STATES PATENTS

| 2,846,232 | 8/1958 | Schnell | 280/11.35(HA) |
| 3,017,944 | 1/1962 | Norrie | 180/69(C) |
| 3,338,326 | 8/1967 | Hafer et al. | 180/69(C) |

OTHER REFERENCES

JOHNSON SKEE-HORSE SNOWMOBILES FOR '68, Johnson Motors, Waukegan, ILL. (Copy available in 180-5), Aug. 1, 1967, (4pp)

*Primary Examiner*—Kenneth H. Betts
*Assistant Examiner*—John A. Pekor
*Attorney*—Flynn & Frishauf

ABSTRACT: A front bonnet having a rear open end is removably engaged with the rear part of each front side frame of a vehicle body by coupling members so that the bonnet is reinforced in rigidity so as to assure a good connection with the vehicle body.

NORIO TAKADA
INVENTOR.

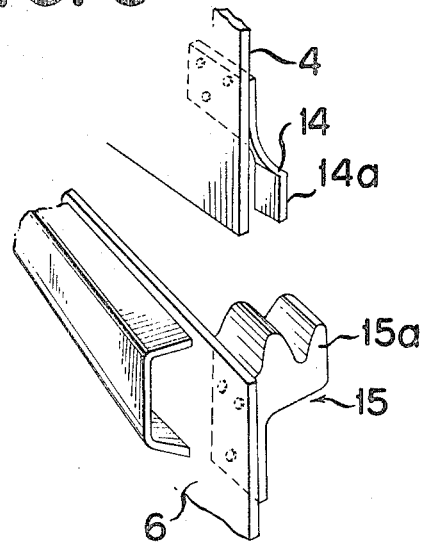
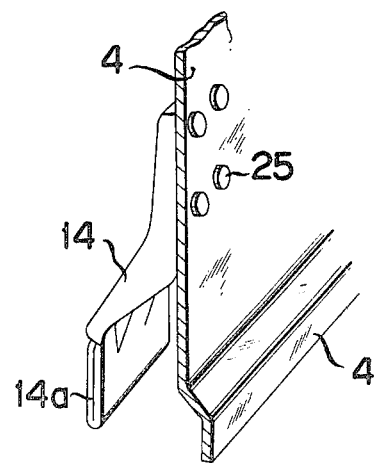
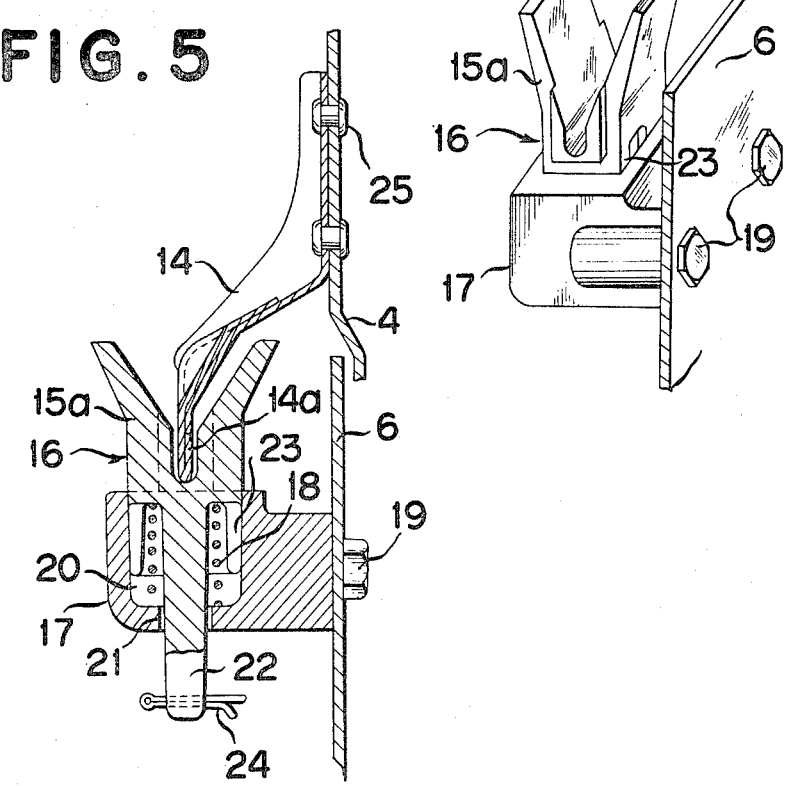

DEVICE FOR ENGAGING A FRONT COVER WITH A SNOW VEHICLE BODY

BACKGROUND OF THE INVENTION

This invention relates to a device for engaging a front cover with a snow vehicle body, and more particularly to improvements in a device for connecting the front cover with the vehicle body.

Prior-art snow vehicles generally had front covers which were rigidly attached to the vehicle body, and rarely had detachable covers. The front cover of the former type had the defect that the dead space defined by said cover can not be utilized, while the front cover of the latter type was of complicated construction, requiring a long time in its opening or closure, more particularly when its peripheral edge is frozen.

A new front cover hinged to the front part of the vehicle body and removably engaged with a front frame at the upper portion of the rear open end thereof by latch means has been designed.

However, the rigidity of said front cover at its rear sides was insufficient to assure good connection with the vehicle body due to its rear end being open.

Therefore, an object of this invention is to provide a device for affording improved rigidity to the rear sides of a front cover for good engagement with a snow vehicle body.

SUMMARY OF THE INVENTION

The engaging device of this invention comprises a pair of first engaging members attached to both rear sides of the front cover respectively, and a pair of second engaging members attached to both sides of the vehicle body in a manner to be removably coupled with said first engaging members respectively. The second engaging members include spring-biased vertically movable members which receive and engage the engaging portions of the first engaging members.

BRIEF EXPLANATION OF THE DRAWINGS

FIG. 3 is a perspective view of the engaging device of this invention;

FIG. 4 is a perspective view of the engaging device modified from that of FIG. 3; and FIG. 5 is a cross-sectional view of the engaging device of FIG. 4.

DESCRIPTION OF THE PREFERRED EMBODIMENTS

Figure 1:
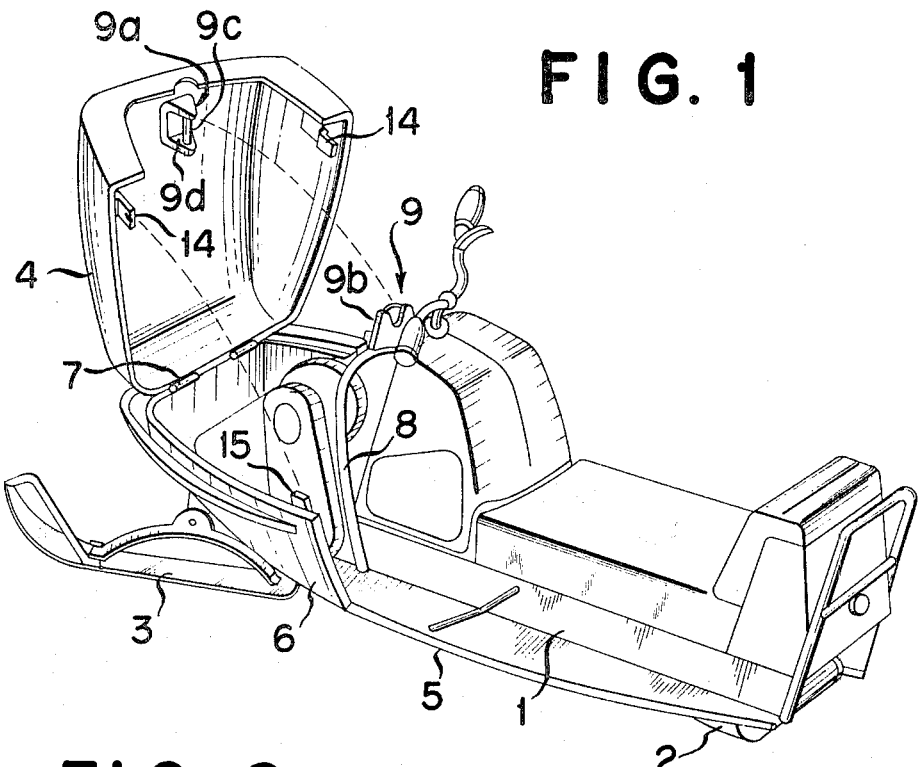
FIG. 1 is a perspective view of a snow vehicle involving the device of this invention for engaging a front cover therewith.
Figure 2:
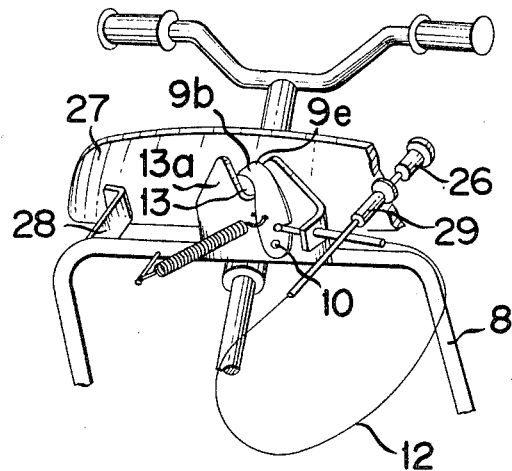
FIG. 2 is a perspective view of a latching means of said snow vehicle.

A snow vehicle illustrated in FIG. 1 is of an endless-belt traction type. Said vehicle mainly consists of a vehicle body 1, an endless-belt traction means 2, a pair of skis 3 for directing the course, a front cover or bonnet 4 mounted in the upper front portion of the vehicle body 1, and a pair of footsteps 5 mounted on the sides of body frame 1. In the front portion of the vehicle body 1 is formed a front hood 6 extending lengthwise of the front portion of each footstep in a manner to surround the front peripheral edge of the vehicle body 1. Said front hood 6 may be integrally formed with the vehicle body 1 or detachably attached thereto by bolt-nut members or the like. The front cover 4 is engaged with the front upper edge of said front hood 6 by hinges 7 and with a front vehicle frame or steering gate 8 consisting of a bent pipe by a latching means 9 of known type.

As further detailed, said latching means 9 consists of a latching member 9a mounted on the inner wall of the front cover 4, and a hook 9b mounted on the middle portion of the steering gate 8.

Said latching member 9a is fabricated by a pin 9c and a U-shaped member 9d, the facing flanges of which are bridged by the pin 9c. Said U-shaped member 9d is attached to the inner wall of the front cover 4. In order to guide the pin 9c to the position at which said pin 9c engages the hook 9b, a guide member 13 with a V-shaped depression 13a is mounted on the middle portion of the steering gate 8. Said hook 9b is rotatably secured to said guide member 13 and biased by urging action of a tension spring 11 disposed on the steering gate 8. Furthermore, said hook 9b is capable of being urged against the resistance of said tension spring 11 by a control wire 12 which can be operated by a knob 26 at the driver's side. On the upper portion of said steering gate 8 is, by means of two struts 28, mounted an instrument panel 27, to which is connected one end of the outer tube of said control wire 12. The inner cable of said control wire 12 is connected to said knob 26 at the same end as the outer tube thereof is connected to said panel 27.

An engaging device of this invention is illustrated in FIG. 3. Said engaging device comprises a pair of first engaging members 14 attached to both rear sides of the front cover 4 respectively, and a pair of second engaging members 15 attached to each side of the vehicle body, i.e. the side portion of the front hood 6 in a manner to be removable coupled with said first engaging members 14 respectively. In this embodiment, the first engaging member 14 has a bladed portion 14a extending downwardly and the second engaging member 15 has a V-shaped depressed portion 15a for receiving the blade 14a. The lengthwise direction of said bladed portion 14a to perpendicular to the axis of said hinges 7. At least one of the engaging members, preferably the second engaging member 15, is made of synthetic resin so that the V-shaped depressed portion 15a can flexibly receive the blade 14a. The first engaging member 14 may be made of metal. Where at least one of the engaging members 14 and 15 is made of synthetic resin, for example, polyethylene having full ice-repellence, and in addition, since the engaging members are positioned at the rear insides of the front cover 4, then said members will hardly stick of each other by icing.

In operation, the front cover 4 is closed by slipping the pin 9c on the head 9e of the hook 9b. The hook 9b is swung against the tension of the spring member 11 during the slipping of the pin 9c and returns to its original position by said tension when it is released by the downward shifting of the pin 9c over the head of the hook 9b, with the result that the hook 9b engages the pin 9c. Simultaneously, the blade 14a is inserted into the depression 15a of the second engaging member 15, enabling the front cover 4 to be engaged with the vehicle body 1, with the rear sides of said cover 4 furnished with great rigidity.

When the hook 9b is pulled sidewise by the operation of the knob 26 against the tension of the spring 11, the hook 9b is disengaged from the pin 9c so as to allow the front cover 4 to be opened. If, in this case, there is provided suitable means for urging the front cover 4 so as to permit its easy opening, the operation of the control wire 12 will cause the hook 9b to be automatically disengaged from the pin 9c.

FIGS. 4 and 5 jointly indicate the modification of an engaging device of this invention. In this embodiment, each of the second engaging members 15 consists of a vertically movable member 16 having the V-shaped depressed portion 15a as aforementioned, a stationary member 17 supporting said movable member 16 with respect to the vehicle body 1, and a spring member 18 attached to said stationary member 17 so as to urge the movable member 16 upwardly within a preset range.

As further detailed, the stationary member 17 is attached to the inside wall of the hook 6 by means of a bolt 19. Said stationary member 17 has a vertical cavity 20 and an opening 21 extending through the bottom of said cavity 20 to the lower outside of the stationary member 17. The movable member 16 has a leg 22 integrally formed with said V-shaped depressed portion 15a in a manner to extend downwardly from its bottom, and a skirt 23 integrally formed with said V-shaped depressed portion 15a and slidable inserted into the cavity 20 of the stationary member 17. Between the bottoms of the V-shaped depressed portion 15a and vertical cavity 20 is compressibly disposed the coiled spring member 18. The leg 22 passes through the opening 21 and has a stop pin 24 mounted on the lower end thereof.

The first engaging members 14 preferably consist of a metal plate formed by bending and pressing processes. Members 14 are respectively attached to the inside wall of the front cover 4 by means of rivets 25.

When the front cover 4 is closed, the blade of the first engaging member 14 is inserted into the depression 15a of the movable member 16 and downwardly presses the bottom of said depression 15a. In this case, the second engaging member 15 enables the movable member 16 to slide into the cavity 20 of the stationary member 17 against the resistance of the spring member 18, so that the front cover 4 is securely closed to such an extent that the latching means can be fully engaged.

I claim:

1. A device for engaging a front cover, which is in the form of a bonnet having a rear open end, with a snow vehicle, the front cover being hingedly connected to the front end part of the vehicle body, and being removably engaged with the frame of the vehicle by a latching means, comprising:
    a pair of first engaging members, each attached to the rear portion of a side of the front cover, each of the first engaging members having a downwardly extending engaging portion; and
    a pair of second engaging members, each attached to a side of the vehicle body, each of the second engaging members including a vertically movable member for receiving and engaging the engaging portion of one of the first engaging members; a stationary member for supporting said movable member with respect to the vehicle body, said stationary member being attached to the vehicle body; and a spring member being attached to the vehicle body; and a spring member attached to said stationary member and urging the movable member upwardly, the first engaging members being removably engaged with the respective second engaging members upon the closing of the front cover.

2. A device according to claim 1, wherein:
    said engaging portion of each of said first engaging members is in the form of a blade; and
    each of the movable members of said second engaging members includes a generally V-shaped depressed portion for receiving and engaging a blade.

3. A device according to claim 1 wherein said vertically movable member is movable within a preset range relative to said stationary member.

4. A device according to claim 1 wherein said movable member is moved downwardly upon engagement with the engaging portion of said first engaging means.

5. A device according to claim 1, wherein said first and second engaging members are disposed relative to said vehicle and cover so that they engage with each other at the upper portion of the rear open end of said front cover.

6. A device according to claim 1, wherein at least one of said engaging members is comprised of a synthetic resin having full ice-repellence.

7. A device according to claim 6, wherein said second engaging members are comprised of a synthetic resin having full ice-repellence.